United States Patent [19]

Collet

[11] Patent Number: 4,655,058

[45] Date of Patent: Apr. 7, 1987

[54] SLEEVE-TYPE SECURITY DEVICE

[76] Inventor: James R. Collet, 315 Lynn Dr., Lafayette, La. 70508

[21] Appl. No.: 477,632

[22] Filed: Mar. 21, 1983

Related U.S. Application Data

[63] Continuation-in-part of Ser. No. 373,439, Apr. 30, 1982, abandoned.

[51] Int. Cl.[4] .......................... F16C 3/00; F16B 41/00

[52] U.S. Cl. ........................................ 70/178; 70/231

[58] Field of Search ................. 70/175, 371, 188, 231, 70/174, 176-180, 181-182

[56] References Cited

U.S. PATENT DOCUMENTS 3,540,245 11/1970 Pope .................................... 70/231

FOREIGN PATENT DOCUMENTS 679101 9/1952 United Kingdom .................. 70/371

*Primary Examiner*—Robert L. Wolfe

*Attorney, Agent, or Firm*—Keaty & Keaty

[57] ABSTRACT

A generally cylindrical shaft having a first internal bore for receiving, at least in part, a portion of a protected item, a second internal bore communicating with the first internal bore and adapted to receive, at least in part, a portion of the protected item, and a third internal bore communicating with the second bore and adapted to receive a lock, said third bore being further provided with a hexagonal port; and a generally cylindrical sleeve having a first internal bore of a diameter slightly greater than the outer diameter of the shaft, and a second internal bore adapted to receive a collar attached to one end of the shaft, said sleeve being adapted to receive the shaft and the collar in rotational relationship within the internal bores.

4 Claims, 3 Drawing Figures

SLEEVE-TYPE SECURITY DEVICE

This application is a continuation in part of my prior co-pending application Ser. No. 373,439 filed Apr. 30, 1982 and now abandoned for my inventions "Removable Theft Deterrent Locking Bolt" and "Theft Deterrent Locking Bolt".

BACKGROUND AND SUMMARY OF THE INVENTION

The present invention relates generally to locking devices and more particularly to the prevention of theft, vandalism and/or sobotage currently directed at the oil/gas industry, and more particularly, towards its vulnerable assets, i.e. Christmas trees, valves, and other wellhead equipment, which are commonly exposed to unauthorized access, for example, located in remote and unguarded areas.

At the present time, the necessity to temporarily abandon, desert and/or leave unprotected said assets by the oil/gas industry manifests the need for a means to protect said assets from potential devious actions. Since permanent sealing and/or immobilizing is highly impractical due to the continued alteration and operation of said assets, removable, mechanical locking devices by which to discretionately immobilize and secure or regain entry to said assets is desperately needed by the oil/gas industry, now.

Present technology, which is virtually wholly embodied by R. A. Lock Co.'s "Checkmate Range Lock" (patent pending), are unable to fully secure/lock said assets nor are they fully tamper-resistant. Most commonly used apparatuses are no more than make-shift tie-downs, i.e. chains, slings, etc. type means of securing locking said assets, which can be cut, burned, hammered, etc. into destruction, thereby rendering them largely ineffective insofar as deterring and preventing theft, sabotage, etc.

To be satisfactory in application such as described above, a locking device must possess extraordinary strength and durability so as to be resistant to tampering by conventional and/or unconventional means, yet allow quick and simple installation or removal.

As aforementioned, in greater detail it will become apparent that the current invention has met these rigid standards to these problems.

In accordance with the present invention, a sleeve-type locking device is disclosed, comprising:

1. an outer sleeve of suitable strength as to withstand abnormal external destructive entry forces and having the ability to rotate around an inner shaft, thereby preventing external wrenching of said internal shaft and being of suitable size and configuration as to cover and be locked into position by said shaft;
2. Said inner shaft, wherein it further comprises a smooth outer surface and internal pocket configurations for accepting, engaging and protecting a desirable lockable item, and a bore adapted to accept, engage and lock with a locking mechanism to prevent unauthorized access to said pockets.

As is apparent from the foregoing, the present invention provides numerous advances surpassing previous technology in oil/gas equipment security, thereby advancing the state of the art. It is therefore the objective of the current invention to provide a security lock effective in securing, protecting and generally locking unattended Christmas trees, valves, and other wellhead equipment, inter alia, against all theft, including hacksaws, shedgehammers, chisels, drills, power saws, wrenches, etc.

In addition to these advantages already mentioned, the present locking device is designed for quick and easy assembly, environmental survivability and overall indestructability, thereby allowing initial installation and minimal maintenance, while providing maximum security. It is therefore the prime objective of the invention to provide a viable and feasible means to secure/-protect unattended Christmas trees, valves and other equipment of the oil/gas industry, and in general, any lockable items.

BRIEF DESCRIPTION OF THE DRAWINGS

Other objects and advantages of the invention will become apparent upon a reading of the following detailed description and upon reference to the drawings in which.

DETAILED DESCRIPTION OF THE PREFERRED EMBODIMENT

Figure 1:
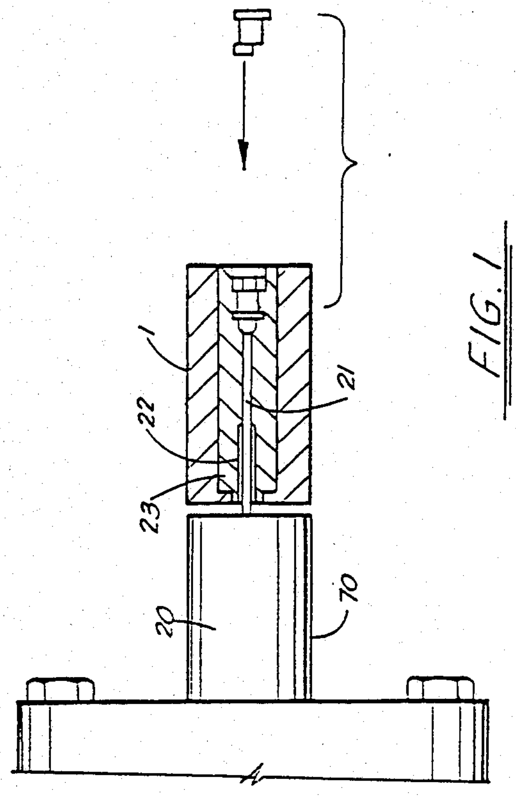
FIG. 1 is a fully assembled longitudinal sectional view of the present invention in relationship to desired lockable item.

Referring now to the drawings, and more particularly to FIG. 1, there can be seen the preferred embodiment of the sleeve-type locking device of the present invention, represented generally by the numeral 1.

Figure 2:
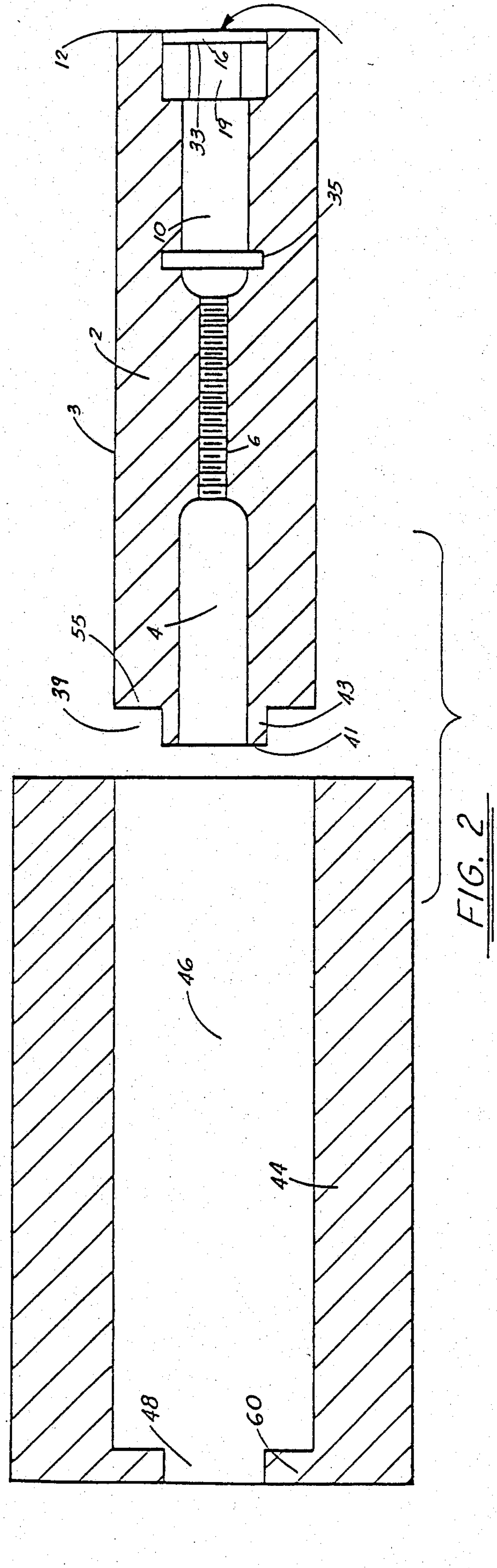
FIG. 2 is a cross-sectional side view of the apparatus of the present invention.
Figure 3:
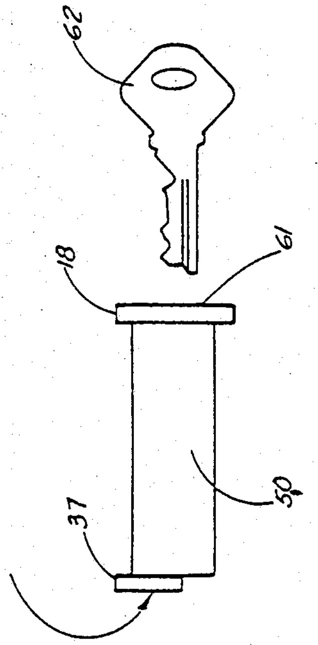
FIG. 3 is a partial longitudinal sectional view of the present invention showing the inner shaft.

As best illustrated in FIG. 2, the present invention comprises, in part, a generally cylindrical shaft 2, preferably made of high integrity steel (e.g. case-hardened Rockwell 60 steel) or any other suitably strong and durable material, having a smooth outer surface 3 and a first longitudinal bore 4 which is adapted for securably receiving and protecting a desired lockable item 20. In the preferred embodiment, second portion 21 of valve stem 23, which is externally threaded, is securably engaged within second longitudinal bore 6 of shaft 2, which directly communicates with the first bore 4 at its inner end, wherein second bore 6 is threadedly adapted to engageably receive second portion 21 of valve stem 23. Shaft 2 further comprises a third longitudinal bore 10 through its outer end, bore 10 being of sufficient depth to accept any suitable locking mechanism, perferably of the simultaneous tumbler, pick-resistant type shown by the numeral 30 in FIG. 3, similar to, for example, U.S. Pat. No. 3,499,302, manufactured by Medeco. Further, third bore 10 comprises a first recess 16 from its outer end 12 of sufficient depth to accept locking cap 18 of locking mechanism 30 so that cap 18 is seated at least substantially flush with outer face 13 of shaft 2, in order to deter forcible extractioned from bore 10 by prying, wedging, etc. means. Further bore 10 comprises a generally hexagonally-shaped allen port 19 having as its top surface 33 the bottom surface of first recess 16, port 19 being of sufficient depth to accept a suitable wrenching device, such as an allen wrench (not shown), to thereby facilitate installation or removal of valve stem 23 onto/from first longitudinal bore 4 and second longitudinal bore 6 of shaft 2, as will hereinafter be more fully elaborated upon. Additionally, third bore 10 is provided with an internal, annular channel 35 at a depth adjacent to keying device 37 of locking mechanism 30, wherein keying device 37 cooperates with channel 35 during operation of the present invention. Shaft 2 further comprises an external recess 39 at its inner end 41 so as to create a protruding collar 43.

Device 1 of the present invention further comprises a generally cylindrical outer sleeve 44 made of steel (e.g. case-hardened Rockwell 60 steel) or any other suitably strong and durable material, wherein sleeve 44, which is a length corresponding to the length of shaft 2, comprises a first longitudinal bore 46 of slightly larger diameter than the outer diameter of shaft 2, from its outer end 12 to the base 55 of external recess 39, and a second longitudinal bore 48 of slightly larger diameter than the outer diameter of protruding collar 43 and of a depth corresponding to the depth of collar 43. Outer sleeve 44 is circumferentially mounted to shaft 2, thereby the shoulder 58 formed by the base 55 of external recess 39 and protruding collar 43 of shaft 2 abuts internal shoulder 60 forward by first bore 46 and second bore 48 of sleeve 44, thereby preventing removal of sleeve 44 from shaft 2 by extraordinary, external, outwardly directed forces of entry to device 1. The inner surfaces of first bore 46 and second bore 48 of sleeve 44 are smoothly-textured, thereby providing a free-wheeling, linear, rotational relationship between sleeve 44 and shaft 2, thereby preventing removal of sleeve 44 from shaft 2 by means of any extraordinary, external, torquing/wrenching force.

In actual practice, the device 1 of the present invention works in the following manner:

1. When it is desired to secure a lockable item, for example, a valve of christmas Tree 20, the valve hand wheel thereof is turned to the desired position (e.g. open), and then removed from valve stem 23;
2. Next, shaft 2, and sleeve 44 circumferentially mounted thereto, are circumferentially mounted to valve stem 23, whereby an allen wrench (not shown), or any other suitable wrenching device compatible with allen port 19 of shaft 2 is employed to thereby facilitate securable engagement/mating of second portion 21 of valve stem 23 into second bore 6 of shaft 2, and snug fitting of first portion 22 of valve stem 23 within first bore 4 of shaft 2;
3. Next, locking mechanism 30 is inserted within third bore 10 of shaft 2, and by manipulation of key 62 within keyhole 61, keying device 37 is actively engaged with annular channel 35 of shaft 2, thereby preventing unauthorized removal of locking mechanism 30, thereby preventing unauthorized access to allen port 19 and thus, preventing removal of shaft 2;
4. It is important to note that the outer diameter of sleeve 44 is preferably such that the inner face 66 of sleeve 44 flushy abuts valve casing 70 of Christmas Tree 20, thereby preventing forcible removal of sleeve 44 and/or shaft 2 by means of sledgehammers, hacksaws, wrenches, chissels, etc;
5. There presently exists no known, typically available tool(s) which would have the capability of penetrating the Rockwell 60 steel of which sleeve 44 is preferably made, thereby preventing access to shaft 2 via sleeve 44 by drilling or like means.

While a particular embodiment of the present invention has been shown and described in detail herein, the same is merely an illustration of the basic inventive concept herein involved and many other forms may be employed within the scope and spirit of the present invention.

What is claimed is:

1. A sleeve-type locking apparatus, comprising:

a generally cylindrical shaft means having a first internal bore for receiving, at least in part, a portion of a protected item, a second internal bore communicating with the first internal bore and adapted to receive, at least in part, a portion of the protected item, and a third internal bore communicating with the second bore and adapted to receive a locking means, said third bore being further provided with a hexagonal port; and a generally cylindrical sleeve means having a first internal bore of a diameter slightly greater than the outer diameter of the shaft means, and a second internal bore adapted to receive a collar means attached to one end of the shaft means, said sleeve means being adapted to receive the shaft means and the collar means in rotational relationship within the internal bores.

2. The apparatus of claim 1, wherein the locking means is adapted to prevent access to the hexagonal port within the third internal bore of the shaft means.

3. The apparatus of claim 1, wherein it further comprises a sleeve-removal deterrent means comprising a collar means attached to the end of the shaft means opposite said third internal bore, said collar means having a smaller outer diameter than that of the shaft means, said collar means being adapted to be rotationally positioned within the second internal bore of the sleeve means, said sleeve removal deterrent means further comprising an internal shoulder in the sleeve means abutting the end of the shaft means adjacent said collar means.

4. The apparatus of claim 1, wherein the second bore of the shaft means is adapted to threadably receive, at least in part, a portion of the protected item.

* * * * *